(12) United States Patent
Saibold et al.

(10) Patent No.: US 7,562,884 B2
(45) Date of Patent: Jul. 21, 2009

(54) VEHICLE HAVING AT LEAST ONE AXLE STEERABLE VIA A KNUCKLE STEERING GEAR

(75) Inventors: Friedrich Saibold, Passau (DE); Stefan Wallner, Friedrichshafen (DE); Klaus Kruber, Künzing (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 560 days.

(21) Appl. No.: 11/264,796

(22) Filed: Nov. 1, 2005

(65) Prior Publication Data
US 2006/0096800 A1    May 11, 2006

(30) Foreign Application Priority Data
Nov. 6, 2004    (DE) .................. 10 2004 053 722

(51) Int. Cl.
*B60G 7/00* (2006.01)
(52) U.S. Cl. ............................................. 280/93.502
(58) Field of Classification Search .............. 280/89.12, 280/93.51, 93.501, 93.502, 93.512; 180/434, 180/435, 440
See application file for complete search history.

(56) References Cited
U.S. PATENT DOCUMENTS

| | | | | |
|---|---|---|---|---|
| 3,814,203 A | * | 6/1974 | Gieszl | 180/414 |
| 3,982,604 A | * | 9/1976 | Crawford | 180/435 |
| 4,064,967 A | * | 12/1977 | Doolittle | 180/435 |
| 4,102,427 A | * | 7/1978 | Sabec | 180/435 |
| 4,114,724 A | * | 9/1978 | Doolittle | 180/435 |
| 5,094,312 A | * | 3/1992 | Hakel | 180/434 |
| 5,129,474 A | | 7/1992 | Rauter et al. | |
| 5,129,477 A | * | 7/1992 | Hurlburt | 180/265 |

FOREIGN PATENT DOCUMENTS

| | | |
|---|---|---|
| DE | 11 12 415 | 8/1961 |
| DE | 39 07 381 A1 | 9/1989 |
| DE | 100 03 936 A1 | 8/2001 |

* cited by examiner

*Primary Examiner*—Paul N. Dickson
*Assistant Examiner*—Robert A. Coker
(74) *Attorney, Agent, or Firm*—Davis & Bujold, P.L.L.C.

(57) ABSTRACT

A vehicle having at least one axle (1) steerable via a knuckle steering system (4) which is designed with one main steering cylinder device (6) flexibly connected with track rods (8A, 8B). The track rods are in operative connection with wheel carriers (10A, 10B). A steering kinematics of the knuckle steering system between the main steering cylinder device and one wheel carrier (10A, 10B), is in flexible operative connection with a lever element (13A, 13B) rotatable around a fixed pivot (14A, 14B) in a manner that a steering angle error corresponding to a demanded steering angle is substantially minimized by a reduction of the angle of lock of the wheel (2A or 2B) currently outside the curve in relation to an angle of lock of the wheel (2B or 2A) currently inside the curve.

19 Claims, 8 Drawing Sheets

VEHICLE HAVING AT LEAST ONE AXLE STEERABLE VIA A KNUCKLE STEERING GEAR

This application claims priority from German Application Serial No. 10 2004 053 722.4 filed Nov. 6, 2004.

FIELD OF THE INVENTION

The invention relates to a vehicle having at least one axle steerable via a knuckle steering gear.

BACKGROUND OF THE INVENTION

Vehicles known from the practice are designed for maneuvering with at least one steerable axle constructed in a manner on the driving system of the vehicle and on the type of wheel suspension. The driver's steering movements or a steering demand are basically transmitted to the wheels of the steerable axle of the vehicle via a steering wheel, a steering column, a steering gear and a swinging kinematics consisting of several parts interconnected by joints so that the wheels of the steerable vehicle axle are designed, swingable from a position equivalent to a straight-ahead start.

In the construction of the vehicle, a fundamental differentiation must further be made between a so-called rotary steering system and a so-called knuckle steering system. That is, the wheels of a steerable vehicle axle having wheels adjusted according to a required steering angle in conformity with the principle of rotary steering, together with an axle extending between the wheels in transverse direction of the vehicle, are swung around a common pivot or around a common steering axis of rotation; a base of the vehicle being reduced by the swinging of the axle and of the wheels whereby a rocking inclination of the vehicle increases. The rotary steering is preferably used in two-axle trailers, since a vehicle designed with a rotary steering system stands out by good maneuverability.

If the steering motions demanded are converted, according to the knuckle steering system principle, each wheel of the steerable vehicle axle is swung around its own steering axis of rotation located on the ends facing the wheels of an axle extending in a transverse direction of the vehicle between the wheels of the steerable vehicle axle. The steering axes of rotation are formed by the connections of the steering points of the wheel suspension or by the longitudinal axes of the knuckle pins. The knuckle steering principle is preferably used in double-tracked motor vehicles, since the base of the vehicle remains at an almost equal dimension when the turn wheels around the coordinated steering axes of rotation whereby a rocking inclination of the vehicle increases to a substantially lesser extent than when using a rotary steering system.

The higher the demands on the maneuverability of a vehicle, increase in the maximum swinging angle of the axle in a rotary steering system or the steering angle of the wheels around the steering axes of rotation in a knuckle steering system are to be provided. Especially in construction machines, a turning circle is required to be as small as possible since, as is common in the use of construction machines, the space available for maneuvering is extensively limited and expensive driving maneuvers are uneconomic.

As a rule, the steering systems of construction machines, especially of telescopic loaders, are designed as knuckle steering systems where the steering movements of a driver are applied to the wheels via a main steering cylinder designed as a synchronous cylinder with continuous piston rod. The power between the wheels and the piston rod of the main steering cylinder is transmitted via a track rod which, in turn, is connected with a joint housing or a wheel head operatively connected with one wheel and jointly is swung around the coordinated steering axis of rotation.

If both swingable wheels of a vehicle, steerable with a knuckle steering system, are equally strongly turned, neither of the two wheels can roll on its natural path. Each wheel is then forced by the other wheel to an unnatural path so that both wheels, in addition to the rolling motion, also perform a more or less strong sliding motion upon the foundation which results in undesired wear of the wheels.

For this reason, basically in the operation of a vehicle and particularly when cornering, the wheels must roll without lateral sliding movement which, under certain circumstances, is very cumbersome for the tires as is the case in a rotary steering system. In knuckle steering systems, this is accomplished by the steering angle of the wheel inside the curve being larger than that of the wheel outside the curve.

The problem of the high tire load during cornering additionally occurs not only between the wheels of a vehicle axle. According to the so-called Ackermann principle, the extended center lines of the knuckle of the turned wheels, for an operation of the vehicle with as little wear as possible or no wear at all, have to strike upon the extended center line of a second non-steerable vehicle axle or intersect at precisely one point with the extended central lines of the knuckles of the wheels of a second steerable vehicle axle. The orbit traversed by the wheels of the two vehicle axles then have a common central point so that the above described sliding motions of the wheels are considerably reduced or entirely prevented.

If the lines or extensions of the center lines of the knuckles of the wheels do not strike at one point, there exists a so-called track angle error or a so-called steering angle error.

In construction vehicles which are designed with short wheel bases, the same as with steerable axles according to the knuckle steering principle in the area of the front axle and also in the area of the rear axle, the Ackermann geometry results which constitutes the ideal ratio between the steering angle position of the wheel inside the curve and the steering angle position of the wheel outside the curve from the half wheel base, wherefore the optimal steering angle position of the wheel outside the curve to the steering angle position of the wheel inside the curve is relatively small. However, determined by the principle of steering kinematics used in the practice, there disadvantageously appears an undesirably great divergence from the optimal steering angle of the wheels, since the steering angle position of the short outer wheel relative to the steering angle position of the wheel inside the curve is too large and besides the inclines transit angle of the tires increases sharply as the steering angle increases. From the above mentioned great divergences from the optimal steering angle and the sharply increasing inclined transit angle of the tires, an undesirable great wear of the tires results when cornering and, in addition, stresses generate in the drive train which require larger dimensions of the parts of the drive train whereby both the operation costs and the production costs of construction vehicles are disadvantageously increased.

Therefore, the problem on which this invention is based is making a vehicle available which stands out, on one hand, by great maneuverability and, on the other hand, both by small tire load and by small stresses in the drive train when cornering.

SUMMARY OF THE INVENTION

The use of an inventively designed vehicle having at least one axle steerable via a knuckle steering system where the knuckle steering system is designed with one main steering cylinder device flexibly connected with track rods which, in turn, are in operative connection with a respective wheel carrier, advantageously results in a small tire load, in comparison with vehicles known from the practice, when cornering and in a reduction of stresses in the drive train accompanied with great maneuverability of the vehicle.

The kinematics are influenced by dividing the track rod into several coupling elements and additional supports, e.g., on the axle pipe. The steering angle of the wheel outside the curve is reduced in relation to the wheel inside the curve. This is obtained by the track rod being divided into track rod and coupling. Supported via a lever which, in turn, supports itself on the axle pipe, the track rod-coupling connection is bent outside the curve and thus shortened. The steering angle reduces itself. The lever moves inside the curve so that the track rod and the coupling remain almost on one line; the steering angle remaining unaffected.

Likewise. a steering kinematics of the knuckle steering system is attained at the time between the main steering cylinder device and one wheel carrier being in flexibly operative connection with a lever element rotatable around a fixed pivot in a manner such that, depending on a position of the pivot and a length of the lever, a steering angle error corresponding to a demanded steering angle is substantially minimized by a reduction of the steering angle of the wheel currently outside the curve in relation to the steering angle of the wheel currently inside the curve.

It is thus possible, in simple manner, to tune the steering angles of the wheels of the steerable vehicle axle with each other, which depend on an actually demanded steering angle and have been adjusted via the main steering cylinder device. The steering kinematics of the knuckle steering system moves to zero so that a steering angle error between the two wheels of the steerable vehicle axle, the same as between the wheels of the steerable vehicle axle and one other vehicle axle. This means that to minimize the steering angle error, the steering angles of the wheels adjusted through the main steering cylinder are tuned with each other, via the steering kinematics, passed by force to the wheels between the main steering cylinder and the wheel carriers over the lever elements so that the steering angle of the wheel outside the curve in relation to the steering angle of the wheel inside the curve is reduced to minimize the steering angle error between said two wheels.

BRIEF DESCRIPTION OF THE DRAWINGS

The invention will now be described, by way of example, with reference to the accompanying drawings. For the sake of clarity in the description of the different embodiments, the same reference numerals for parts having the same design and function will be used. The drawings show.

DETAILED DESCRIPTION OF THE INVENTION

Figure 1:
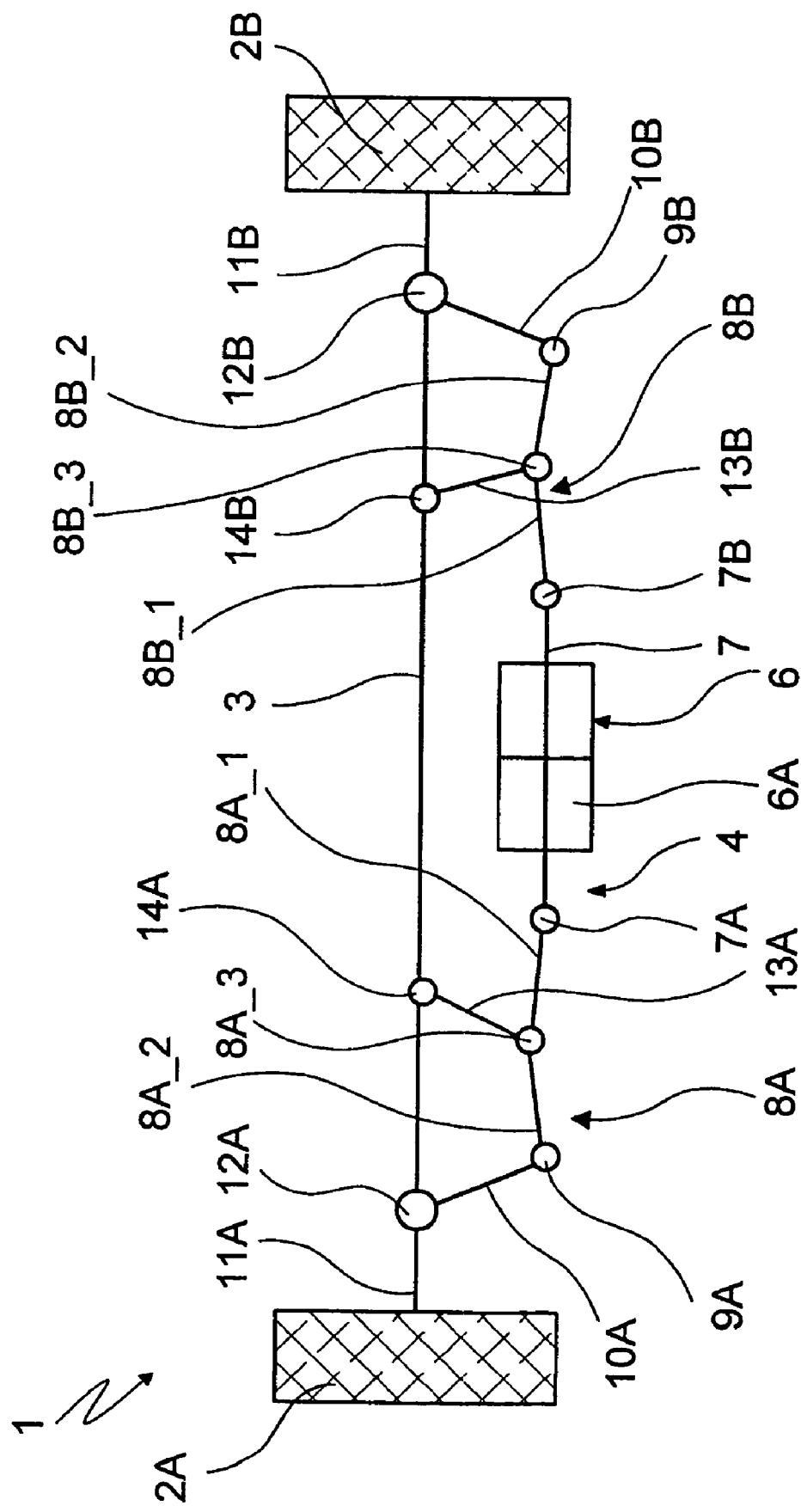
FIG. 1 is a basic view of a steerable vehicle axle, the steering kinematics of which, in the area between the main steering cylinder device and the wheel carriers, is in operative connection with a lever element in a state equivalent to a straight-ahead start.
Figure 2:
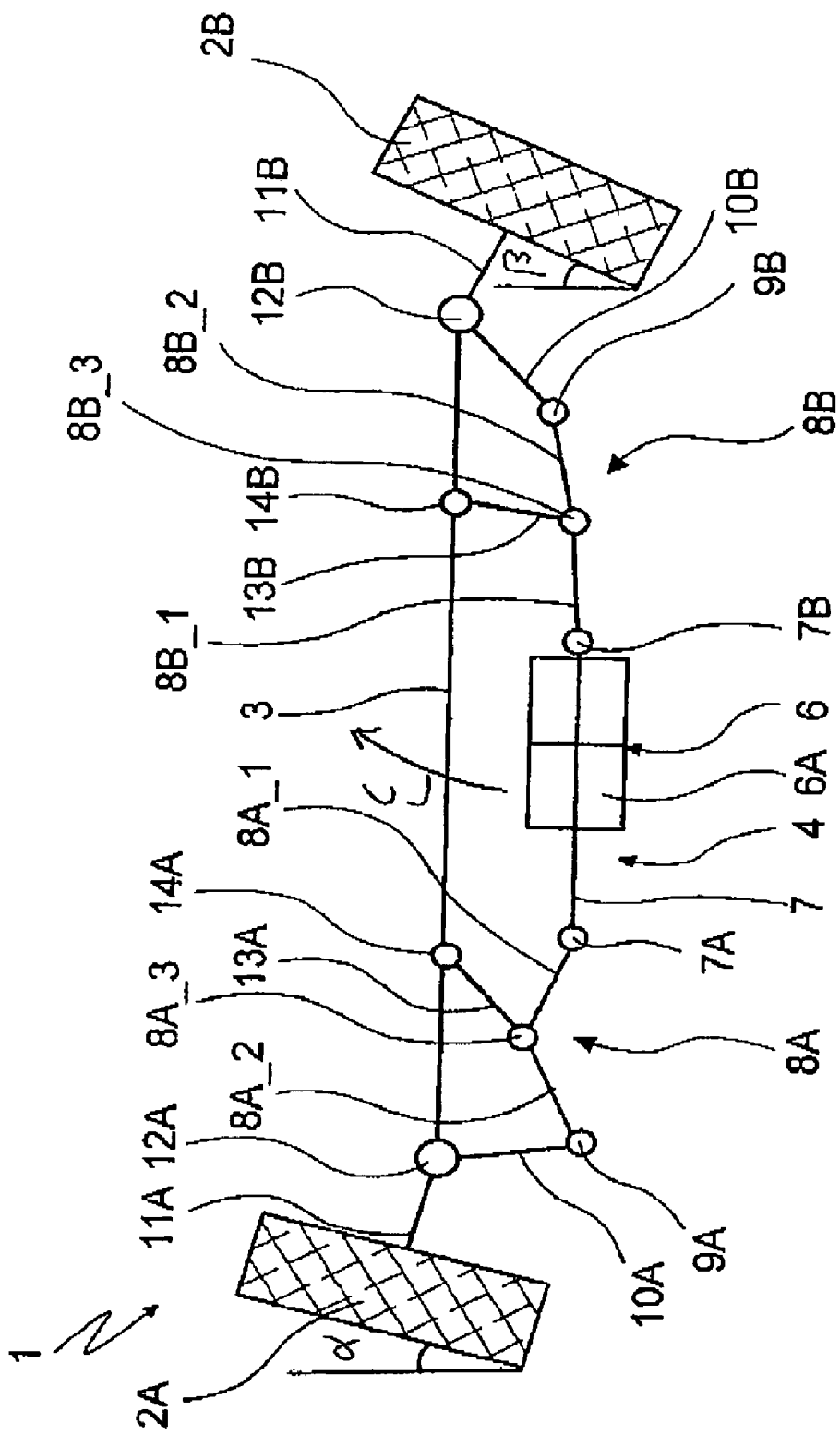
FIG. 2 is a vehicle axle shown in FIG. 1 in a state equivalent to cornering.

In FIG. 1, a steerably designed vehicle axle 1 of a construction vehicle is shown in an extensively schematized, self-contained graph. Wheels 2A and 2B of the steerable vehicle axle 1 can be converted from the position shown, which corresponds to a straight-ahead start of the vehicle, to a deviated or to a locked position for a cornering of the vehicle. In FIG. 2, the vehicle axle 1 is shown as a front axle under a driver's demand for a right hand curve C. To convert a driver's demand for a change of driving direction, the wheels 2A and 2B of the vehicle axle 1 can be brought, via a knuckle steering system 4, from the position shown in FIG. 1 to the deviated position corresponding to the currently demanded steering angle.

The knuckle steering system 4 is constructed with a main steering cylinder device 6 designed with a synchronous cylinder 6A and disposed extending in a vehicle transverse direction parallel with an axle 3 of the vehicle axle 1 situated between the wheels 2A, 2B. A piston rod 7 of the main steering cylinder device 6 is connected on both its ends via a piston rod joint 7A, 7B designed as a universal joint with a respective track rod 8A or 8B. The track rods 8A and 8B are, in turn, connected with wheel carriers 10A, 10B, via the track rod joints 9A, 9B, situated on their ends remote from the piston rod 7. The wheel carriers 10A, 10B are fixedly connected with the wheel hubs 11A, 11B of the wheels 2A and 2B which, in turn, together with the wheels 2A and 2B, are pivotably designed around the steering axes of rotation 12A, 12B opposite the axle 3.

To control the oscillating motion of the wheels 2A, 2B of the vehicle axle 1 produced by the movement of the piston rod 7, the spaces between the track rod joints 9A, 9B and the piston rod joints 7A, 7B are of different design. To that end, the track rods 8A, 8B are designed in two parts, the partial track rods 8A_1, 8A_2 or 8B_1, 8B_2 being flexibly interconnected via connecting joints 8A_3 or 8B_3, likewise, designed as universal joints. The track rods 8A, 8B are flexibly connected in the area of the connecting joints 8A_3, 8B_3 with the axle 3 of the vehicle axle 1 respectively via lever elements 13A, 13B. Both lever elements 13A and 13B are rotatably designed on their ends remote from the connecting joints 8A_3 or 8B_3 around the pivots 14A, 14B fixedly connected with the axle 3 and which can also be secured to another place on the side of the body so that the connecting joints 8A_3 or 8B_3 are flexibly in operative connection with the axle 3 so that the lever elements 13A and 13B respectively constitute a restraint for the connecting points 8A_3 or 8B-3 and the steering angle of lock of the wheel currently outside the curve in relation to the steering angle of lock of the wheel currently inside the curve is reduced so that a steering angle error is preferably reduced toward zero.

The advantage of the inventively designed steering kinematics of the knuckle steering system 4 of the vehicle axle 1 results from comparison of the view of FIG. 1 and FIG. 2. The direct comparison of the two views shows that both the angle between the two partial track rods 8A_1 and 8A_2 and between the wheel carrier 10A and the partial track rod 8A_2 connected therewith via the track rod joint 9A, in comparison with the angles between the partial track rods 8B_1 and 8B_2, the same as between the wheel carrier 10B and the partial track rod 8B_2 flexibly connected therewith via the track rod joint 9B, are changed so that the currently demanded steering angle of the actual angle $\alpha$ of wheel 2A outside the curve in relation to the steering angle $\beta$ of wheel 2B inside the curve is reduced compared to a vehicle known from the practice in the sense that a resulting steering angle error between the two wheels 2A and 2B is easily minimized.

This means that the pivots 14A and 14B, the same as the lengths of the lever elements 13A and 13B, are provided so that the steering kinematics of the wheel 2A outside the curve is changed in the manner above described and minimizing of a steering angle error while the parts of the steering kinematics coordinated with the wheel 2B inside the curve remain almost on one line in the area of the partial track rods 8B_1 and 8B_2 so that the steering angle of lock of the wheel currently inside the curve which is produced by control of the main steering cylinder device 6 is adjusted almost unchanged compared to a conventionally made steerable axle.

FIG. 3 to FIG. 8 show six other embodiments of an inventive steerable vehicle axle which constructionally differ only in partial areas from the vehicle axle shown in FIG. 1 and FIG. 2, all the embodiments shown in the drawings being fundamentally based on the inventive mode of operation, namely, that the lever kinematics of the knuckle steering system 4 between the piston rod 7, the main steering cylinder device 6 and the wheels 2A, 2B easily changes according to the currently demanded steering angle and the steering angle of the wheel 2A and the steering angle of the wheel 2B automatically coordinate with each other in a manner such that, compared to conventional knuckle steering systems, a steering angle error is reduced or completely prevented.

Figure 3:
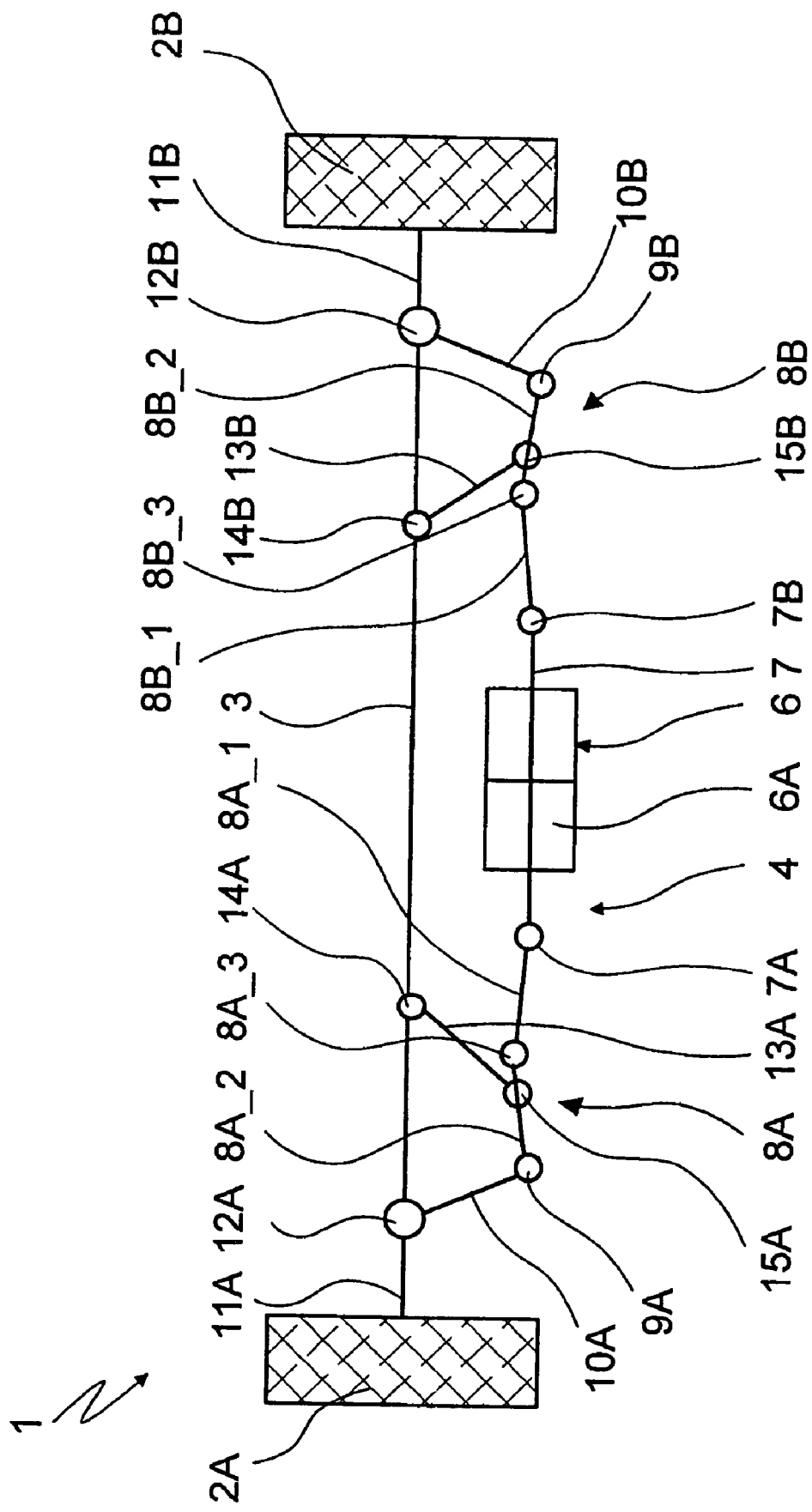
FIG. 3 is a second embodiment of the vehicle axle shown in FIG. 1.

In the vehicle axle 1 shown in FIG. 3, the lever elements 13A, 13B are flexibly connected via lever element joints 15A, 15B with respective partial track rods 8A_2 or 8B_2 operatively connected with the wheel carriers 10A or 10B, while the partial track rods 8A_1, 8A_2 and 8B_1, 8B_2 are interconnected via the connecting joints 8A_3 and 8B_3.

Figure 4:
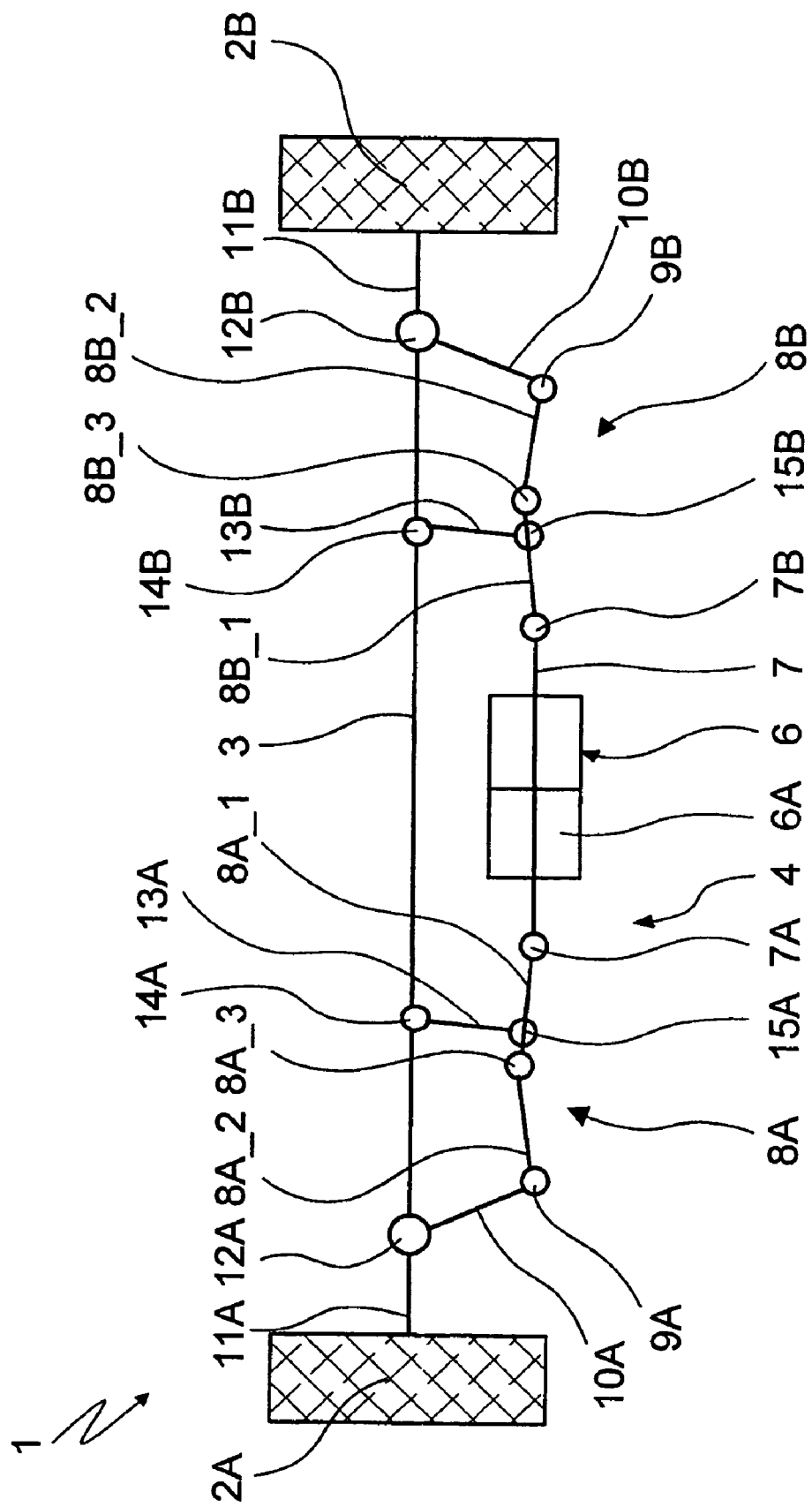
FIG. 4 is a third embodiment of an inventive steerable vehicle axle in a graph corresponding to FIG. 1.

Alternatively to this, in the embodiment of the vehicle axle 1 shown in FIG. 4, the lever elements 13A and 3B are operatively connected via the lever element joints 15A or 15B with the partial piston rods 8A_1 or 8B_1 operatively connected with the piston rod 7 in order to control and adjust the steering kinematics of the knuckle steering system 4 in the manner described in detail in relation to FIG. 1 and FIG. 2 to minimize a steering angle error during cornering.

Figure 5:
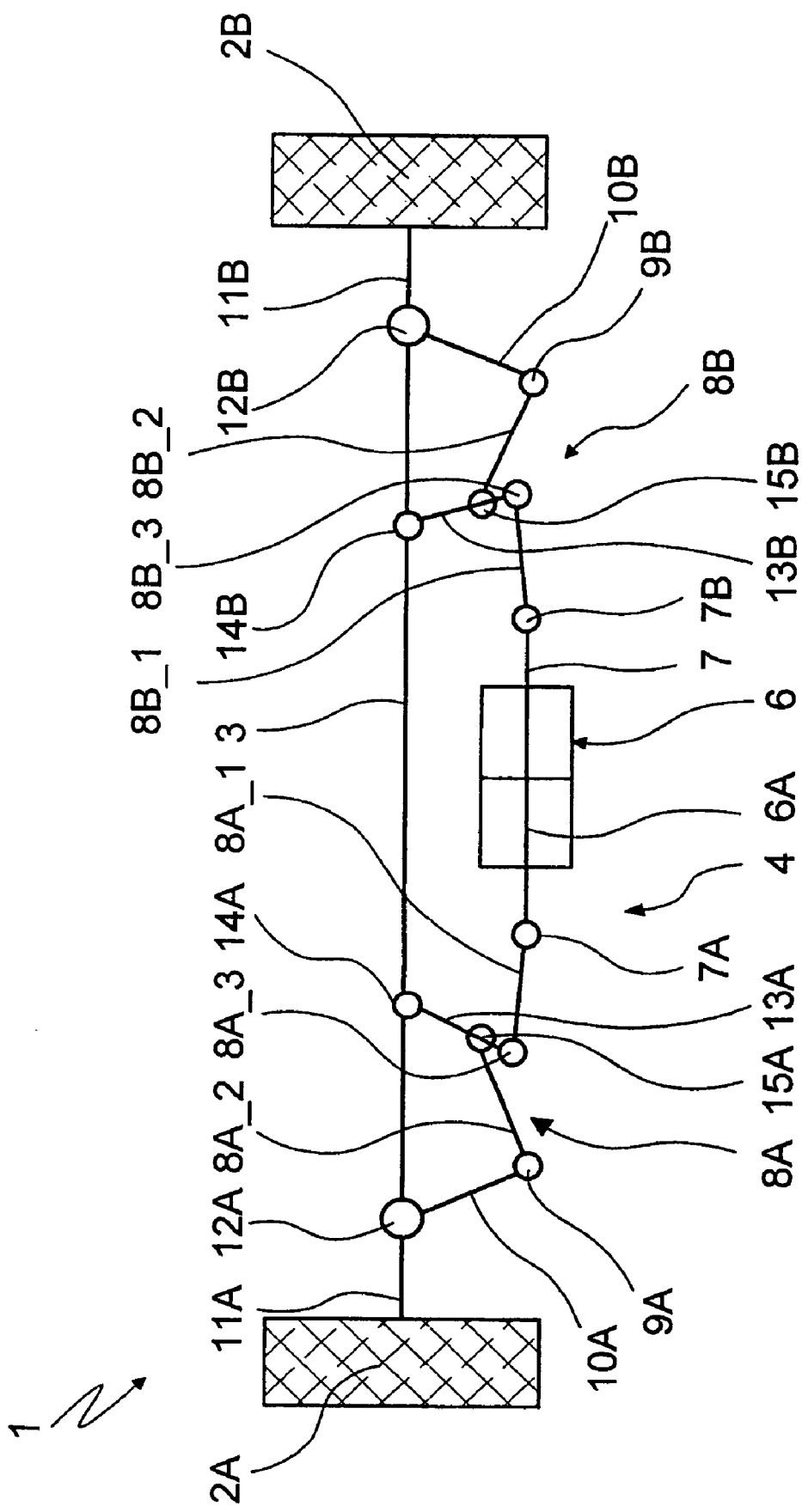
FIG. 5 is a fourth embodiment of an inventive vehicle axle basically shown in FIG. 1.

In the fourth embodiment of an inventively configured vehicle axle 1 shown in FIG. 5, the partial track rods 8A_1 or 8B_1 operatively connected with the piston rod 7 of the main steering cylinder device 6 are flexibly operatively connected via the connecting joints 8A_3 or 8B_3 with the lever elements 13A and 13B. In addition, the partial track rods 8A_2 or 8B_2 operatively connected with the wheel carriers 10A and 10B are flexibly connected via the lever element joints 15A and 15B with the lever elements 13A and 13B so that the partial track rods 8A_1 and 8A_2 of the track rod 8A and the partial track rods 8B_1 and 8B_2 of the track rod 8B are operatively interconnected respectively via the lever elements 13A or 13B.

Figure 6:
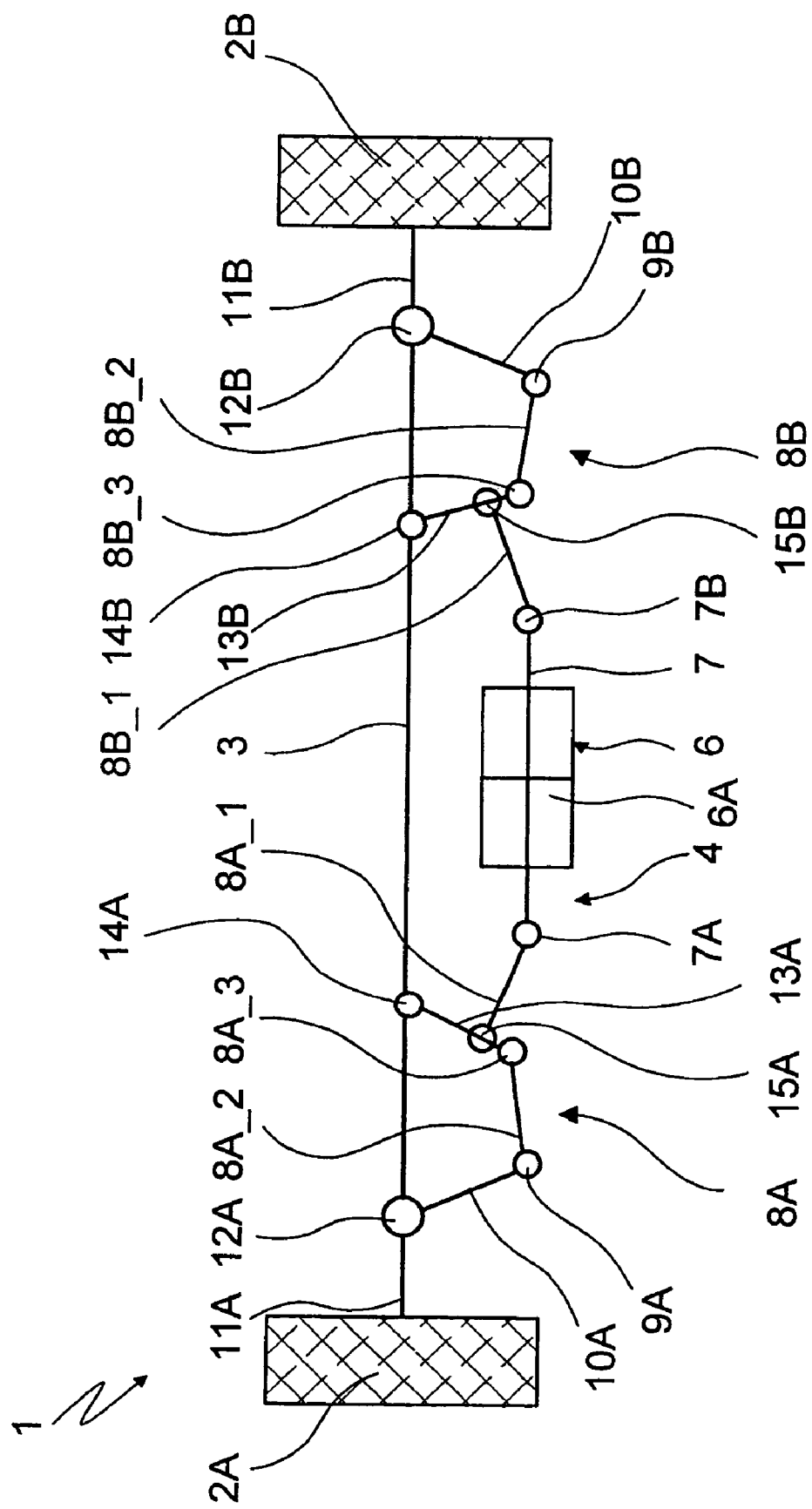
FIG. 6 is a fifth embodiment of an inventive steerable vehicle axle.

Alternative to this, in the embodiment of the vehicle axle 1 of FIG. 6, the partial track rods 8A_1 or 8B_1 connected with the piston rod 7 of the main steering cylinder device 6 are flexibly connected via the lever element joints 14A or 15B with the lever elements 13A or 13B which by way of the connecting joints 8A_3 or 8B_3 are flexibly connected with the partial track rods 8A_2 or 8B_2, respectively, operatively connected with the wheel carriers 10A or 10B so that here the partial track rods 8A_1, 8A_2 of the track rod 8A or the partial tract rods 8B_1, 8B_2 of the track rod 8B are also connected via the lever elements 13A or 13B, respectively.

Both in the embodiments of the vehicle axle 1 shown in FIG. 5 and also in FIG. 6, the partial track rods 8A_1, 8A_2 or 8B_1, 8B_2, respectively, of the track rods 8A or 8B are operatively interconnected via joint points rigidly interconnected so that it is possible to adjust one control of the wheels 2A and 2B diverging from the embodiments of the vehicle axle 1 shown in FIG. 1 and in FIG. 3.

Figure 7:
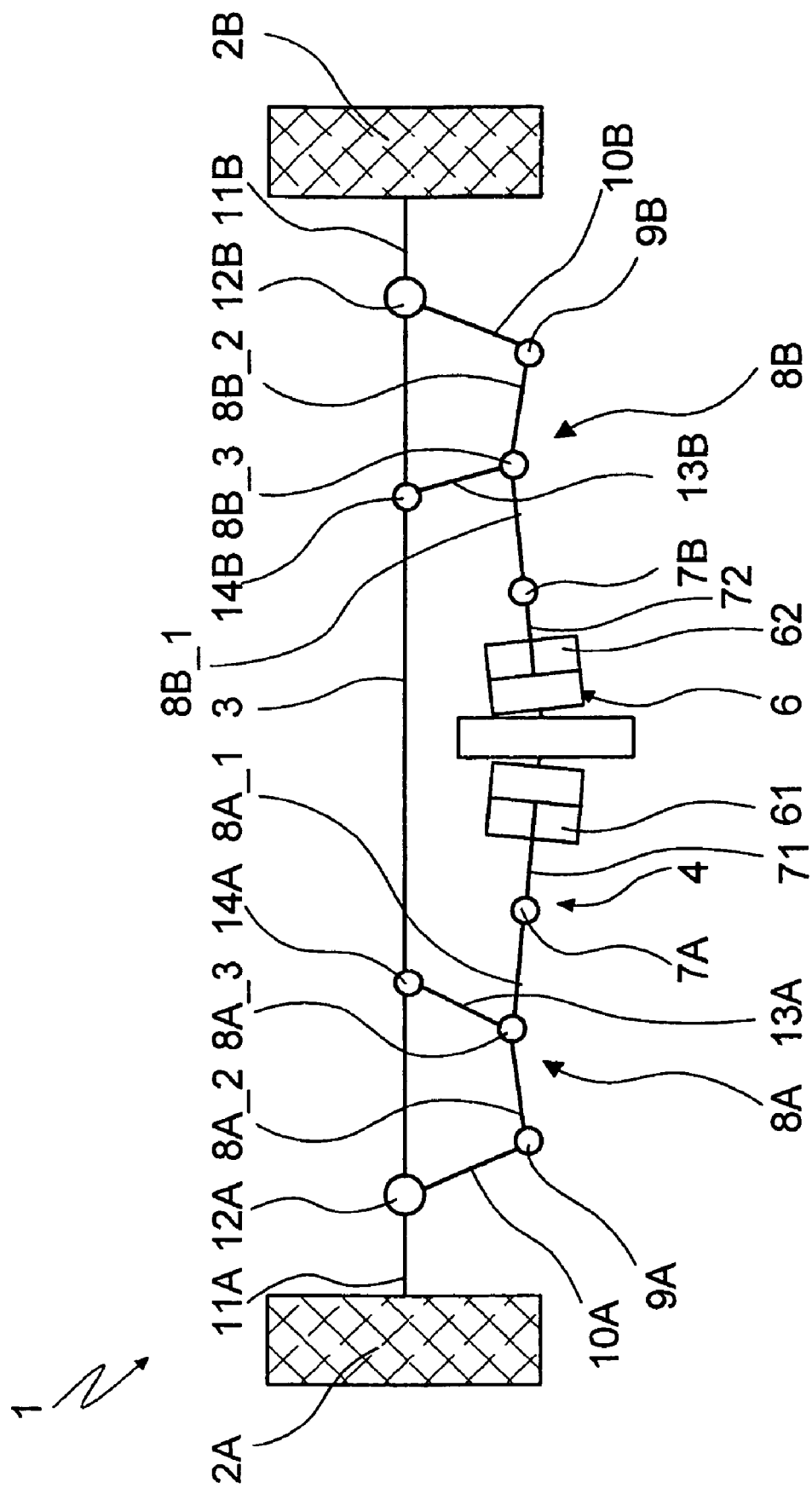
FIG. 7 is a sixth embodiment of an inventive vehicle axle whose main steering cylinder device is designed with two main steering cylinders.

In the sixth embodiment of the vehicle axle 1 shown in FIG. 7, the main steering cylinder device 6 is designed with two one-sidedly operating main steering cylinders 61 or 62. This configuration of the main steering cylinder device 6 is used, for example, in vehicles which have only a small installation space in a longitudinal direction so that the main steering cylinder device 6 has to be designed as divided in the manner shown in FIG. 7. Both main steering cylinders 61 and 62 of the main steering cylinder device 6 are here controlled via a common control device (not shown in detail), to convert in the way required a demanded steering angle. In addition to the above described mechanical adaptation of the two steering angle locks of the wheels 2A and 2B, it is possible in this embodiment of the vehicle axle 1 to control the steering angle error via piston rods 71 and 72 of the main steering cylinders 61 and 62 by a different hydraulic control of the steering kinematics of the knuckle steering system 4 coordinated, respectively, with the wheel 2A or the wheel 2B in a manner such that the steering angle error between both wheels 2A and 2B can be reduced preferably toward zero.

Figure 8:
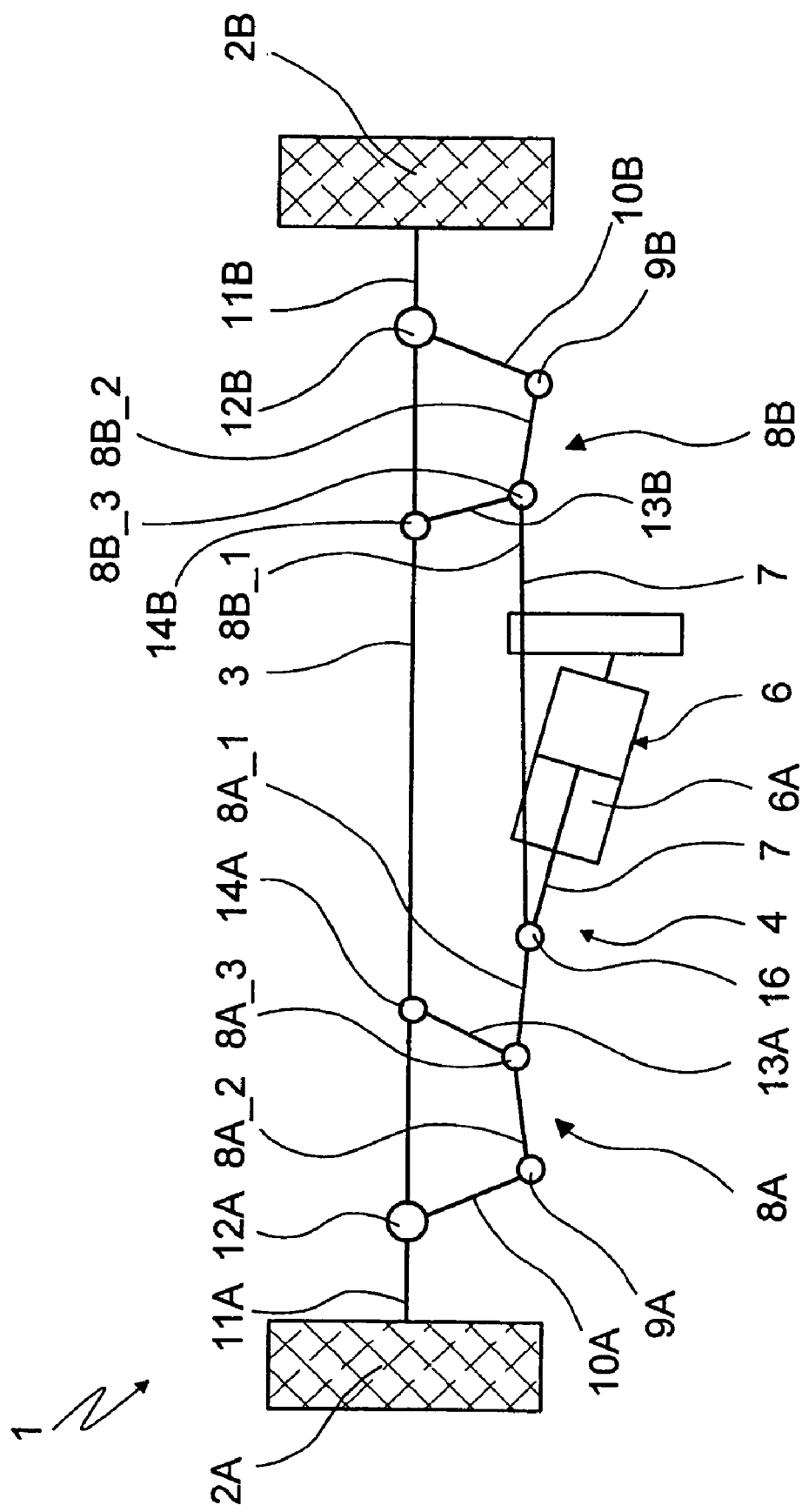
FIG. 8 is a seventh embodiment of an inventive vehicle axle where the track rods have a common coupling point with the main steering cylinder device.

A seventh embodiment is shown in detail in FIG. 8 where the track rod 8A coordinated with the wheel 2A and the track rod 8B coordinated with the wheel 2B have a common coupling point 16 with the main steering cylinder device 6 designed with a double-acting main steering cylinder 6A. The common coupling point 16 is designed here as a double-acting universal joint so that both the partial track rod 8A_1 of the track rod 8 and the partial track rod 8B_1 of the track rod 8B can perform in the area of the coupling point 16. The swinging movements required for the inventive control of the wheels 2A and 2B and the control movements generating from the main steering cylinder device 6 or the piston rod 7 thereof are transmitted in the required way to both wheels 2A and 2B.

The embodiments of the vehicle axle 1 shown in the drawings can be used both as front axle or as rear axle so as to design a vehicle having in the area of the wheels 2A and 2B front wheel steering or rear wheel steering of low wear. But further it is also possible to design a two-axle vehicle with two axles corresponding each to a vehicle axle extensively schematized shown in FIG. 1 to FIG. 8 so as to make an all-wheel jointed vehicle of great maneuverability available and, at the same time, low load of the tires and of the parts of the drive train of the vehicle.

REFERENCE NUMERALS 1 vehicle axle
2A, 2B wheel 3 axle
4 knuckle steering system
6 main steering cylinder
6A main steering cylinder, synchronous cylinder
7 piston rod
7A, 7B track rod
8A_1, 8A_2, 8B_1, 8B_2 partial track rod
8A_3, 8B_3 connecting joint
9A, 9B track rod joint
10A, 10B wheel carrier
11A, 11B wheel hub
12A, 128 driving axis of rotation
13A, 13B lever element
14A, 14B pivot
15A, 15B lever element joint
16 common coupling point
61, 62 one-sidedly operating main steering cylinder
71, 72 piston rod

The invention claimed is:

1. A vehicle having at least one axle (3) with left and right wheels (2A, 2B) which are steerable via a knuckle steering system (4), wherein the knuckle steering system (4) comprises a main steering cylinder device (6) flexibly connected with respective left and right track rods (8A, 8B) which, in turn, are respectively operatively connected with left and right wheel carriers (10A, 10B), and each of the left and the right wheel carriers (10A, 10B) being fixedly connected with a respective wheel hub (11A, 11B) which supports one of the left and the right wheels (2A, 2B), a left lever element (13A) being flexibly connected to the left track rod (8A), in an area between the main steering cylinder device (6) and the left wheel carrier (10A, 10B), while a right lever element (13B) being flexibly connected to the right track rod (8B), in an area between the main steering cylinder device (6) and right wheel carrier (10A, 10B);

the left track rod (8A) comprises a first partial left track rod (8A_1) flexibly connected to a second partial left track rod (8A_2) by at least one connecting joint (8A_3, 15A) such that the first partial left track rod (8A_1) being movable relative to the second partial left track rod (8A_2), and the the right track rod (8B) comprises a first partial right track rod (8B_1) flexibly connected to a second partial right track rod (8B_2) by at least one connecting joint (8B_3, 15B) such that the first partial right track rod (8B_1) being movable relative to the second partial right track rod (8B_2); each of the left and the right lever elements (13A, 13B) being rotatably about a respective fixed pivot (14A, 14B) such that, according to a position of the fixed pivot (14A, 14B) and a position of the left and the right lever elements (13A, 13B), deviation from a desired steering angle of one of the left and the right wheels (2A or 2B) traveling along an outside a curve in relation to a desired steering angle of the other of the left and the right wheels (2B or 2A) traveling along an inside the curve is minimized.

2. The vehicle according to claim 1, wherein the left and the right track rods (8A, 8B) and the left and the right wheel carriers (10A, 10B) of the wheels (2A, 2B) are respectively connected via a track rod joint (9A, 9B) and the left and the right track rods (8A, 8B) and the main steering cylinder device (6) via a piston rod joint (7A, 7B), and a spacing between the track rod joint (9A, 9B) and the piston rod joints (7A, 7B) is changeable.

3. The vehicle according to claim 1, wherein the the first and the second partial left track rods and the first and the second partial right track rods (8A_1, 8A_2, 8B_1, 8B_2) are interconnected via the respective connecting joints (8A_3, 8B_3) so that a spacing, existing between the track rod joints (9A, 9B) and the piston rod joints (7A, 7B), can be changed by changing an angle between the the first and the second partial left track rods and the first and the second partial right track rods (8A_1, 8A_2, 8B_1, 8B_2).

4. The vehicle according to claim 1, wherein the left and the right lever elements (13A, 13B) currently in an area of the respective connecting joints (8A_3, 8B_3) are operatively connected with the steering kinematics of the knuckle steering system (4).

5. The vehicle according to claim 1, wherein the left and the right lever elements (13A, 13B) currently in an area of the first partial left and right track rods (8A_1, 8B_1), connected with the main steering cylinder device (6), are operatively connected with the kinematics of the knuckle steering system (4) via the respective connecting joints (8A_3, 15A, 8B_3, 15B).

6. The vehicle according to claim 1, wherein the left and the right lever elements (13A, 13B) currently in an area of the second partial left and right track rods (8A_2, 8B_2), connected with the wheel carriers (10A, 10B), are operatively connected with the steering kinematics of the knuckle steering system (4) via the respective connecting joints (8A_3, 15A, 8B_3, 15B).

7. The vehicle according to claim 1, wherein the track rods (8A, 8B) are each respectively connected via a lever element joint (15A, 15B) with one of the left and the right lever elements (13A, 13B) so that a spacing between the track rod joints (9A, 9B) and the piston rod joints (7A, 7B) is changed by changing an angle between the two partial track rods (8A_1, 8A_2, 8B_1, 8B_2).

8. The vehicle according to claim 1, wherein the fixed pivot (14A or 14B) of the left and the right lever element (13A or 13B) is fixedly connected with the at least one axle (3) extending substantially in a transverse direction of the vehicle between wheels (2A, 2B) of the vehicle axle (1).

9. The vehicle according to claim 1, wherein the fixed pivot (14A, 14B) of the left and the right lever element (13A, 13B) is fixedly connected with a part fastened on a body of the at least one axle (3).

10. The vehicle according to claim 1, wherein the main steering cylinder device (6) is a double-acting main steering cylinder (6A).

11. The vehicle according to claim 1, wherein the main steering cylinder device (6) comprises two single-acting main steering cylinders (61, 62).

12. The vehicle according to claim 1, wherein the vehicle axle (1) is a front axle.

13. The vehicle according to claim 1, wherein the vehicle axle (1) is a rear axle.

14. The vehicle according to claim 1, wherein the vehicle has at least two steerable vehicle axles.

15. A vehicle having at least one axle (3) supporting left and right wheels (2A, 2B) which are steerable via a knuckle steering system (4), the at least one axle (3) being located between the left and the right wheels, the knuckle steering system (4) comprising a main steering cylinder device (6) being flexibly connected, via a piston rod (7), with left and right track rods (8A, 8B) coupled with respective left and right wheel carriers (10A, 10B), the left wheel carrier (10A) being fixedly connected with a left wheel hub (11A) which supports the left wheel (2A) while the right wheel carrier (10B) being fixedly connected with a right wheel hub (11B) which supports the right wheel (2B), a left lever element (13A) being flexibly connected to both the at least one axle (3) and the left track rod (8A), at a location between the main steering cylinder device (6) and the left wheel carrier (10A, 10B), while a right lever element (13B) being flexibly connected to both the at least one axle (3) and the right track rod (8B), at a location between the main steering cylinder device (6) and right wheel carrier (10A, 10B);

an axial length of the piston rod (7) and the left and the right track rods (8A, 8B) is less than a spacing distance between the left and the right wheels (2A, 2B) such that the piston rod (7) and the left and the right track rods (8A, 8B) are all accommodated between the left and the right wheels (2A, 2B);

the left track rod (8A) comprises a first partial left track rod (8A_1) flexibly connected to a second partial left track rod (8A_2) by at least one connecting joint (8A_3, 15A) such that the first partial left track rod (8A_1) is movable relative to the second partial left track rod (8A_2), and the right track rod (8B) comprises a first partial right track rod (8B_1) flexibly connected to a second partial right track rod (8B_2) by at least one connecting joint (8B_3, 15B) such that the first partial right track rod (8B_1) is movable relative to the second partial right track rod (8B_2) each of the left and the right lever elements (13A, 13B) is rotatably about a respective fixed pivot (14A, 14B) such that, according to a position of the fixed pivot (14A, 14B) and a position of the left and the right lever elements (13A, 13B), deviation from a desired steering angle of one of the left and the right wheels (2A or 2B), traveling along an outside of a curve, in relation to a desired steering angle of another of the left and the right wheels (2B or 2A), traveling along an inside of the curve, is minimized.

16. The vehicle according to claim 15, wherein the at least one connecting joint for the left track rod (8A) is a left connecting joint (8A_3, 15A) and the first partial left track rod (8A_1) is flexibly connected to the second partial left track rod (8A_2) by the left connecting joint (8A_3, 15A) and one end of the left lever element (13A) is also flexibly connected to the left connecting joint (8A_3, 15A), and the at least one connecting joint for the right track rod (8B) is a right connecting joint (8B_3, 15B) and the first partial right track rod (8B_1) is flexibly connected to the second partial right track rod (8B_2) by the right connecting joint (8B_3, 15B) and one end of the right lever element (13B) is also flexibly connected to the left connecting joint (8B_3, 15B).

17. The vehicle according to claim 15, wherein the at least one connecting joint for the left track rod (8A) is a left connecting joint (8A_3, 15A) and the first partial left track rod (8A_1) is flexibly connected to the second partial left track rod (8A_2) by the left connecting joint (8A_3) and one end of the left lever element (13A) is flexibly connected to the second partial left track rod (8A_2) by a left lever element joint (15A), and the at least one connecting joint for the right track rod (8B) is a right connecting joint (8B_3, 15B) and the first partial right track rod (8B_1) is flexibly connected to the second partial right track rod (8B_2) by the right connecting joint (8B_3) and one end of the right lever element (13B) is flexibly connected to the second partial right track rod (8B_2) by a right lever element joint (15B).

18. The vehicle according to claim 15, wherein the at least one connecting joint for the left track rod (8A) is a left connecting joint (8A_3, 15A) and the first partial left track rod (8A_1) is flexibly connected to the second partial left track rod (8A_2) by the left connecting joint (8A_3) and one end of the left lever element (13A) is flexibly connected to the first partial left track rod (8A_1) by a left lever element joint (15A), and the at least one connecting joint for the right track rod (8B) is a right connecting joint (8B_3, 15B) and the first partial right track rod (8B_1) is flexibly connected to the second partial right track rod (8B_2) by the right connecting joint (8B_3) and one end of the right lever element (13B) is flexibly connected to the first partial right track rod (8B_1) by a right lever element joint (15B).

19. The vehicle according to claim 15, wherein the at least one connecting joint for the left track rod (8A) is a left connecting joint (8A_3, 15A) and the first partial left track rod (8A_1) is flexibly connected to the left lever element (13A) by the left connecting joint (8A_3) and the second partial left track rod (8A_2) is also flexibly connected to the left lever element (13A) by a left lever element joint (15A), and the at least one connecting joint for the right track rod (8B) is a right connecting joint (8B_3, 15B) and the first partial right track rod (8B_1) is flexibly connected to the right lever element (13B) by the right connecting joint (8B_3) and the second partial right track rod (8B_2) is also flexibly connected to the right lever element (13B) by a right lever element joint (15B).

\* \* \* \* \*